(12) United States Patent
Anderson et al.

(10) Patent No.: US 7,139,808 B2
(45) Date of Patent: Nov. 21, 2006

(54) METHOD AND APPARATUS FOR BANDWIDTH-EFFICIENT AND STORAGE-EFFICIENT BACKUPS

(75) Inventors: Andrew V. Anderson, Hillsboro, OR (US); Steven M. Bennett, Hillsboro, OR (US); Scott H. Robinson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 702 days.

(21) Appl. No.: 10/136,756

(22) Filed: Apr. 30, 2002

(65) Prior Publication Data

US 2003/0204609 A1 Oct. 30, 2003

(51) Int. Cl.
*G06F 15/167* (2006.01)
*G06F 12/14* (2006.01)

(52) U.S. Cl. ............. 709/212; 709/231; 709/247; 711/161; 711/162

(58) Field of Classification Search ........ 709/217–219, 709/229–232, 211–212, 247; 711/161–162
See application file for complete search history.

(56) References Cited

U.S. PATENT DOCUMENTS 6,807,632 B1* 10/2004 Carpentier et al. ......... 713/165

2002/0035622 A1* 3/2002 Barber ....................... 709/220
2005/0010792 A1* 1/2005 Carpentier et al. ......... 713/193

OTHER PUBLICATIONS

Sean Quinlan and Sean Dorward, "Venti: a new approach to archival storage", Usenix Association, Proceedings of the FAST 2002 Conference on File and Storage Technologies (Monterey, CA USA, Jan. 28–30, 2002) (14 pages including cover).

* cited by examiner

*Primary Examiner*—Glenton B. Burgess
*Assistant Examiner*—Yasin Barqadle
(74) *Attorney, Agent, or Firm*—Blakely, Sokoloff, Taylor & Zafman LLP (57) ABSTRACT

A method is presented that includes generating a content identifier for at least one article. The content identifier identifies the article. Also, determining if at least a portion of the at least one article is present on at least one device based on the content identifier. The at least one portion of the at least one article is stored if the at least one portion of the at least one article is determined to be not present on the at least one device. Also presented is a method including requesting at least one article by a content identifier representing the article. The at least one article is determined if it is present on at least one device based on the content identifier. At least one portion of the at least one article is returned if the at least one portion of the at least one article is determined to be present on the at least one device.

49 Claims, 6 Drawing Sheets

METHOD AND APPARATUS FOR BANDWIDTH-EFFICIENT AND STORAGE-EFFICIENT BACKUPS

BACKGROUND

1. Field

Embodiments of the invention relate to computer system backup, and more particularly to a method and apparatus for providing bandwidth-efficient and storage-efficient backups and restoration.

2. Description of the Related Art

As computer systems, such as personal computers (PCs), servers, personal digital assistants (PDAs), cellular telephones, etc. assume a more centralized role as the life repository of schedules, documents, digital photos, movies and recordings, etc., the exposure to loss of system functionality and use becomes increasingly great. This is because the information lost may truly be information that cannot be recreated, regardless of the cost or effort. Backing up and restoring data on computer systems can be problematic for many computer users. Even though users have their mission-critical personal or business data on their computer systems, which may have required hundreds or even thousands of hours to create, many users do not take appropriate steps to guarantee that their data is preserved in case of a catastrophic event. Such catastrophic events can include system failures, hard drive failures, fire, or other disasters.

If a user of a computer system believes that they cannot reliably store, and thus recover valuable information, these users may be unwilling to use the computer system as a repository for important information. Therefore, data protection security may prove to be a formidable barrier to digital technology adoption. Other problems that a user may have with backing up data are the time it takes to complete a backup, the reliability of the backup destination, and the ease of use of a backup system.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Embodiments of the invention generally relate to a method and apparatus for bandwidth-efficient and storage-efficient backup and restoration. Referring to the figures, exemplary embodiments of the invention will now be described. The exemplary embodiments are provided to illustrate the embodiments of the invention and should not be construed as limiting the scope of the embodiments of the invention.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

For the sake of clarity in describing embodiments of the invention, the terms 'client' and 'server' are used as follows. The term 'client' herein describes a logical device that uses a backup/restore service. The term 'server' herein is used to represent a logical device that provides a backup/restore service. A logical device may contain one or more computing systems, such as desktop personal computers (PCs), workstations, file servers, personal digital assistants (PDAs), digital cameras, cellular telephones, or other devices containing a processing unit (network routers, set-top boxes, etc.). Note that it is possible for a logical device to contain multiple physical devices, or for a single physical device to contain multiple logical devices. One example of this would be a single physical device, such as a computer, running multiple virtual or simulated machines.

Also for the sake of clarity in describing embodiments of the invention, the term 'article' is used herein. The term 'article' comprises objects to be stored or manipulated, including: available storage locations (e.g., directories), user data (e.g., text, photos, music, movies, etc.), applications (e.g., word processors, spread sheets, web browsers, etc.), operating system executables, command scripts, byte codes, configuration data, manifests, registries, libraries, drivers, documentation, Web pages, etc. Articles can reside on a computer system device in a number of storage locations comprising non-volatile memory, volatile memory, hard disks, holographic storage, delay lines, etc. Articles often have associated metadata, which may be either explicitly or implicitly defined. For example, articles stored on a hard disk typically have an explicitly associated directory path name, access permission lists, etc. Other articles, for example, can have implicitly associated metadata, such as the code and data stored in flash memory in many devices (e.g. basic input/output system (BIOS) in a personal computer). These latter articles can be uniquely identified and assigned permissions, etc., in an analogous manner. Note that there is also metadata that is not associated with one or more articles either explicitly or implicitly. Examples of this article-nonspecific metadata include the date and time a backup was started, the version of the operating system, the storage capacity of a device, etc. The term "metadata" herein may refer to any type of metadata.

Given the existence of a large pool of computer system clients, a great deal of redundancy exists in terms of articles. Some of the groups of redundant articles are, for example, core operating system articles, application articles, documentation and commercial media articles. A great deal of redundancy typically exists between the contents of a machine at a given time and the contents of the same machine at a later time. Redundancy may also exist within the contents of a machine at a single point in time. The various embodiments of the invention to be discussed detect and leverage such redundancy in order to make the transfer, processing (i.e., manipulation), and storage of articles more efficient. For example, enabling multiple articles with identical contents to share a single stored copy of those contents.

A "contour," herein, comprises a snapshot of the state of every article within a designated collection of articles and supplementary annotations or metadata at a given time. A contour can be constructed for a given collection of articles on the client's system and can comprise every article on the client device or a proper subset of articles on the client device. The state of a given article comprises a representation of article contents and possibly other client-specific article metadata. A contour may comprise additional supplementary annotations or metadata, such as a unique name or identifier for the contour, the date and time the contour was created, integrity signatures (e.g., checksums), etc. Contours of the same collection of articles, but created at different times, can be used to capture the evolution of the articles in the collection and the relationships between articles over time. In an embodiment of the invention, a contour may be constructed for a collection of zero or more articles.

For clarity of presentation, and not by way of limitation, a limited number of examples are shown for illustration with respect to what information is contained within a contour and where that information is stored or organized, etc. For example, the above definition of a contour includes monolithic, centralized representations and distributed representations. Centralized representations include tape archive formats, such as those produced by the UNIX® Operating System (OS) TAR (tape archive) command (The Single UNIX Specification, V2 (UNIX 98), February 1997). In this representation, article contents and associated article names and access permissions are stored in the contour. Distributed representations include UNIX® OS RCS (Revision Control System), in which articles are stored such that contour name, contour date and time, article name, user annotations about the article evolution, and article contents are stored in separate objects (The Single UNIX Specification, V2 (UNIX 98), February 1997). The embodiments of the invention presented herein are not limited to these contour representations. Thus, a contour may be represented by a single article or by a collection of articles. Additional metadata and information associated with or about the contour may or may not be stored in multiple distinct articles.

The "null contour," herein, refers to a contour that has no constituent element articles. That is, a contour over an empty collection of articles. Usually, there is no need to explicitly associate any metadata (e.g., creation time) with such a contour. The "null contour" often represents a point in time before which any contour was created simply because it was not necessary or the constituent articles did not exist.

Herein, a "differential contour" refers to a contour representation that comprises differences between some given reference contour and the new contour. An identifier for the referenced contour, must be stored as part of the differential contour. A differential contour contains information about articles present in the new contour, but not present in the reference contour. These are referred to as "additions." Additionally, the differential contour includes information indicating articles that appear in the reference contour and are not in the new contour. These are referred to as "deletions." If articles have been modified, then this is indicated in the differential contour as a "modification." In one embodiment of the invention, a modification to an article will be represented by a "deletion" of the original article and the "addition" of the new article.

If differences between the reference contour and the new contour are few, then differential contour representation is very space efficient. The reference contour may be the null contour. In this case, all articles in the new contour are included in the differential contour as additions. Note that it is most useful for the reference contour to be over the same set or closely related set of articles. Only the set of articles contained in the intersection of the reference contour and the new contour can be represented differentially. If the intersection of the sets of articles comprised by the reference and new contour is empty, then using the reference contour is effectively the same as using the null contour as a reference with regard to the additions that must be represented in the differential contour. Because of this, it may sometimes be preferable to use the null contour instead of a poorly matched (non-null) reference contour to avoid having to detail the deletions in the differential contour.

An example of a reference contour is as follows:

a contour that was generated after installation of operating system/application software or downloading of multimedia articles, etc., such as the initial state of a computer system before first use, a contour representing the initial state of application software before first use, a contour representing the state of multimedia articles after initial installation, a contour representing all articles on a computer system when initially set-up or manufactured by a computer system manufacturer/distributor or prior to a first backup or at some other time, a contour representing the state of an application or application package supporting a class of articles. For each article, a set of articles may exist to operate on the specific article, or interact with the article (such as, picture viewers that allow pictures to be viewed, music players, word processors, etc.). Useful or related groups of articles can exist for applications or multimedia materials, such as, word processor packages, network browsers, database packages, documentation, movies, pictures, music, specific operating systems, combinations of the aforesaid, etc. Such predefined or standard reference contours are possible because installed or downloaded applications, such as Microsoft® Office 2000, are often placed at the recommended default location in a computer's article system hierarchy and contain a pre-determined set of articles.

a contour derived from other information on a computer system (e.g., library behavior during run-time, linker/loader information, startup/shutdown behavior, etc.).

The selection of the reference contour directly determines the size of the differential contour representations. In one embodiment of the invention, various algorithms can be used for selection of the reference contour in order to minimize computation or bandwidth requirements. Examples of these algorithms include: always select the null reference contour (i.e., the differential contour consists of the full contents of the new contour); always select the previous (last) contour; randomly select a reference contour (this algorithm can be used for validation and integrity checking); and generate the minimum distance reference contour, which can be computed. In one embodiment of the invention, a client determines the reference contour selection algorithm used.

A differential contour is a form of a "compressed contour." In a compressed contour, metadata is used to reduce the verbosity of the contour representation and therefore create a more compact representation. In a differential contour, the associated metadata includes an identifier of the reference contour used in generating the differential contour. Herein, an "expanded contour" or "expanded-form contour" refers to a contour that is not compressed in this manner. An expanded contour representation requires no other contour to be referenced in order to determine the contour's full contents. One should note that compression through the use of metadata is distinguishable from compression from known encoding compression techniques (e.g Lempel-Ziv compression algorithms, named after Abraham Lempel and Jacob Ziv), which can also be used with compression through metadata.

Differential representational forms are often more storage space efficient, but trade storage space for time used in computing the corresponding expanded form. In order to convert a differential contour into an expanded form, the chain of reference contours must be available. Chaining of subsequent contours to previous contours, etc., allows for an expanded representation form to be constructed. Therefore, it is evident that the differential contour form is often more compact than an expanded contour. The necessary reference contours, however, must be available for expansion. For transmission efficiency with respect to differential contours, the benefit is available only if both sides already have all of the necessary reference contours. In one embodiment of the invention, the greatest time cost is in computing the most space efficient differential contour. Several differential contours may need to be generated in order to calculate distance metrics to optimize space efficiency. Space efficiency often translates into transmission efficiency since there is less information (e.g. only the differences) to transfer.

Herein, a "collection contour" refers to a contour representation that comprises a collection of contours. Collection contours typically comprise a collection of contours that are mutually exclusive; that is, for any pair of contours in the collection there are no shared articles. Collection contours can, however, contain one or more contour pairs in which there are shared articles. For some operations the presence of shared articles is of no consequence. Each constituent contour in the collection can be evaluated or treated separately. For other operations, such as the conversion of a collection contour into an expanded representation, the sharing can require additional policy rules, possibly including human intervention. Collection contours, like differential contours, also make use of reference contours. Reference contours are used by collection contours to describe or point to a constituent contour element in the collection, not as a reference for computing differences. This permits large space savings as only the name and certain associated information about a contour need be saved in the collection. The referenced contour is assumed to be stored as a separate contour entity.

Herein, the use of the term "contour" may also refer to any of the above representations, including hybrid (contour) representations. Hybrid contour representations can include, for example, nested collection contours (collection contours of collection contours), differential collection contours (differentially represented collection contours), etc.

In one embodiment of the invention, metadata and policies are used to appropriately designate the representation used within a given contour. In the case of differential contours, for instance, this will include reference contour information. As required, additional metadata and management policies are used to permit proper information organization, transfer, processing, and storage.

In one embodiment of the invention, the most efficacious representation of contours is determined (e.g., expanded, differential, collection, etc.) in terms of storage, processing (manipulation) and communication efficiencies. For example, there are times where an expanded contour representation could be more efficient than a differential contour representation if the representation of differences between the reference contour and the new contour is so large that the total differential contour size is greater than that of the expanded contour. In an embodiment of the invention, differential contours with a null contour as the reference contour can be recognized, manipulated and stored as expanded contours.

A Content Identifier (CI) includes a value representing the contents of an article. In one embodiment of the invention, the CI includes a signature of the article's contents. In one embodiment of the invention, the CI is relatively small in size, e.g., 24–48 bytes. In one embodiment of the invention, the CI is generated using a cryptographic hash algorithm, such as a message digest algorithm (e.g., MD5) or secure hash algorithm (e.g., SHA-1). In this embodiment of the invention using well-known cryptographic hash algorithms, a signature value characterizing the specific article's contents is generated. One should note, however, that other cryptographic algorithms, content-derived or attribute-derived signaturing algorithms (e.g., cyclic redundancy check (CRC) checksums), or compression mechanisms may be used with embodiments of the invention. Collectively, herein, these methods are referred to as "content-signaturing" or simply "signaturing" mechanisms and the output of the methods are referred to as a "content signature" or "signature." One should also note that any portion or combination of the above mentioned generation means for a CI may be combined together, or used separately for different embodiments of the invention.

A number of content signatures may be combined, through a variety of mechanisms (e.g., concatenation, Boolean bit-wise exclusive-OR'ing, etc.), to form a CI. By using one or more content-signaturing mechanisms to generate CI values, the CI uniquely identifies, for all practical purposes, the contents of a particular article, not just on the user's system, but across the sample space of all computer systems.

In one embodiment of the invention, CIs are used to establish a partition over the set of articles serviced by a server using a CI-based equivalence relation; that is, two articles are considered to be "equivalent" and belong to the same block of the partition if they have the same CI. By definition, partition blocks contain mutually exclusive elements, each partition block is non-empty, and the union of all blocks in a partition is a set of articles serviced by the server. Note, however, that if two articles have identical CIs it does not necessarily mean that their location (or other associated metadata) is the same. It is preferred that the CI-based equivalent relation produces the same partitioning of the set of articles serviced by the server as does the equivalence relation produced by pair-wise comparing respective article contents. These two partitions can differ if CI aliasing occurs. Aliasing of CIs occurs when two articles with differing contents have an identical CI assigned to them. Although technically possible, aliasing is highly unlikely with the choice of a robust content signaturing mechanism.

To decrease the probability of CI aliasing, in one embodiment of the invention, the CI includes a combination of one or more cryptographic hashes, augmented by a content signature generated from a subset of article contents or metadata associated with the article. For example, a content signature generated by an MD5 secure hash algorithm may be augmented with article size information (appropriately formatted by a content signaturing mechanism) to produce a more robust CI. It is preferable to employ a CI derived only from the contents (e.g., cryptographic hash of the article contents) or metadata concerning the contents (e.g., content length). As other items of metadata are introduced, system correctness is maintained, but efficiency is reduced, as multiple articles with the same contents but different metadata may no longer be linked (i.e., mapped) to a single copy of the contents on the backup device.

In order to increase the degree of redundancy that may be exposed, in one embodiment of the invention, articles of certain types may undergo one or more normalizing transformations into a standard, possibly canonical, format prior to calculation of content identifiers. In this embodiment of the invention, content identifiers may be generated based on the normalized representation's contents and metadata. For example, an article representing a file in a compressed format (e.g. a file compressed using gzip, compress, or some other compression algorithm) may be transformed (i.e. decompressed) so that the content identifier is generated from the expanded contents and expanded size. Important metadata such as archiving or compression technique used would be added to the collection of metadata for these articles.

In one embodiment of the invention, articles of certain types may be transformed to expose a collection of constituent articles contained within a single article. For example, an article representing a file in a specific type of format may be replaced with metadata and article contents for the articles that comprise the file. Important metadata such as archiving or compression technique would be added to the collection of metadata for these articles. Examples of such compound articles or article collections include, but are not limited to, archives (shell, tar, ar, library, etc), multi-resolution representations of multimedia (e.g. different compression rates for music, video, or still pictures), etc.

In one embodiment of the invention, normalizing transformations may be applied only to a subset of possible candidates. For example, decomposition of collection articles may only occur the first time that an article is presented to the backup service. Compressed articles may be uncompressed only if they are of a certain size or type, or as a function of the resources of the client machine (e.g. disk space, computational resources, available memory, etc).

In one embodiment of the invention, a portion of the articles may be encrypted before presentation to the backup service. In one embodiment of the invention, encryption occurs only for files that are specifically designated for encryption by the user or designated for encryption through filtering rules. Example filtering rules might include: 'encrypt all locally generated content' or 'encrypt all spreadsheet articles'. In one embodiment of the invention, multiple clients may employ identical encryption keys and algorithms to increase exposed redundancy.

In one embodiment of the invention, the content identifier for the encoded article is first sent to the backup server, and additional communication phases may be introduced in which the server requests an expanded representation for a set of encoded articles.

A content signaturing mechanism identifier may be associated with a particular content signaturing mechanism. This versioning information can prevent cross-algorithm aliasing and permit a system to be migrated to an improved CI generation mechanism, if desired (e.g., over time, the system may change the mechanism in use). This identifier may be used to facilitate systems where multiple content signaturing algorithms are in use simultaneously. This identifier may be used as metadata in computing content signatures, implicitly including the identifier in every CI generated. Alternatively, as discussed below, the identifier may be stored explicitly and not used explicitly in the computation of CIs.

CIs may be included in a contour to capture the state of the article contents. In an embodiment of the invention, a contour may consist of only a list of CIs for the articles included in the contour.

Figure 1:
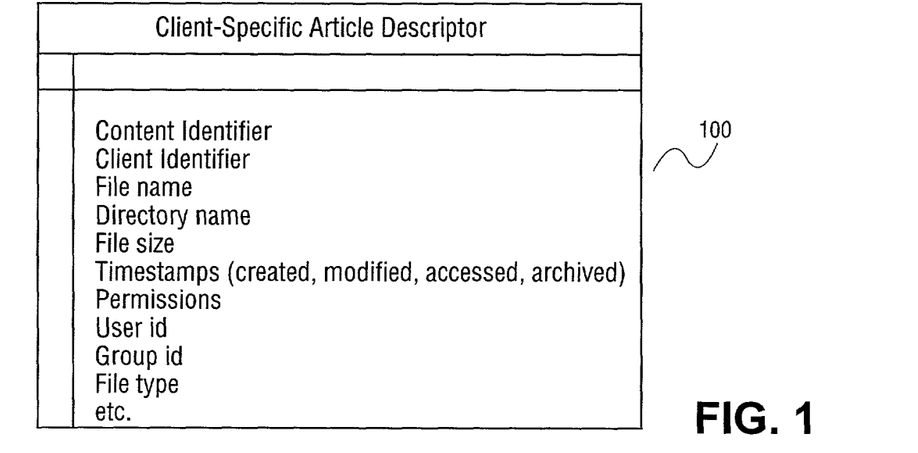
FIG. 1 illustrates a Client-Specific Article Descriptor (CSAD) as utilized by one embodiment of the invention.

FIG. 1 illustrates Client-Specific Article Descriptor (CSAD) 100 as used by one embodiment of the invention. CSAD 100 includes an article's CI as well as all metadata required by the article's system to restore the article metadata to the current state (i.e., everything except for the contents). In this embodiment of the invention, CSAD 100 includes a CI, article name, article location within the system (e.g., directory path name), article size, time stamps (e.g., time of creation, modification, last accessed, when archived), access permissions, user identification, group identification, and article type. One should note that other metadata can be used with embodiments of the invention. For example, CSAD 100's fields can vary according to the systems (e.g., devices, operating systems or file systems) in use on the client. Also, fields present can be derived from implicit information, for example, the location of a flash memory image in a router, or explicitly, such as from directory information. In one embodiment of the invention, required metadata can be a subset of available metadata—e.g., on some system "last-accessed time" may not be included in CSAD 100, even though it is available on the system containing the article. In one embodiment of the invention, a content signaturing mechanism identifier is included in CSAD 100 to reflect the algorithm used to generate the CI.

Figure 2:
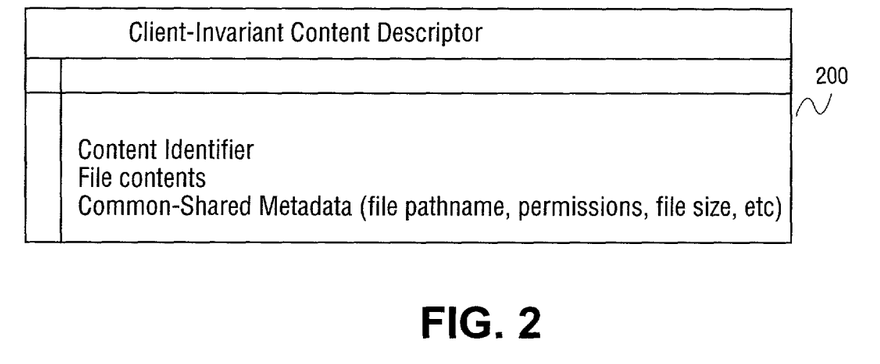
FIG. 2 illustrates a Client-Invariant Content Descriptor (CICD) as utilized by one embodiment of the invention.

FIG. 2 illustrates Client-Invariant Content Descriptor (CICD) 200 includes a CI, article contents and can also include commonly shared metadata (e.g., article location (e.g., path name), access permissions, article size, etc.). In one embodiment of the invention, a content signaturing mechanism identifier is included in CICD 200 to reflect the algorithm used to generate the CI.

CICD 200 is identified (i.e., referenced) by a CI. In one embodiment of the invention, CICD 200 includes a content field that contains the contents of the articles with the corresponding CI. In one embodiment of the invention, CICD 200 also includes default information that can indicate metadata values that are frequently associated with articles containing this content. For example, this default metadata can include a default article location, default access permissions, etc. In one embodiment of the invention, CICD 200 contains multiple default information structures that are indexed by some metadata associated with the client (e.g., operating system, machine classification, user classification, etc.).

In one embodiment of the invention, CSAD 100 is generated for each article stored on the system. In one embodiment of the invention, once the backup server has received CSADs for the articles to be backed up, a mechanism exists for efficiently representing the information contained in the CSADs as well as maintaining metadata about the client and transaction that generated a given CSAD. In this embodiment of the invention, the backup server maintains a Client-Specific Article Record (CSAR) for each article on the client system. The CSAR contains the necessary information to reconstruct a CSAD from a CICD. In one embodiment of the invention, the CSAR contains all of the metadata originally associated with the article on the client system. In another embodiment of the invention, the CSAR contains information to select the appropriate set of defaults from the CICD as well as client specific metadata that differs from the specific set of defaults. In one embodiment of the invention, the CSAR also contains metadata about the backup status of the article (e.g., the contours to which it belongs, date/time of backup, etc.).

As previously described, a CSAR can contain override metadata for a specific article whose contents and associated default metadata (e.g., article path name, article permissions, article owner, etc.) are stored in the CICD. In this embodiment of the invention, override metadata can be used to provide article-specific changes. In one embodiment of the invention, override metadata may not only include attributes of articles, but may also include rules (e.g., regular-expression-based rules), filters, or other specification, execution and policy mechanisms that permit the application of overrides to a contour and/or the contour's constituent components (e.g., articles, article groups, collection contours, etc.). Herein the term "override metadata" comprises these cases.

In one embodiment of the invention, override metadata can be associated with an article, a set of articles, a contour, a collection contour, etc. In one embodiment of the invention, override metadata is stored with the associated item. In one embodiment of the invention, override metadata is stored at some level in a nested set of contours and is applied to designated contours and/or subordinate contours, i.e., contours and articles at lower nodes.

In one embodiment of the invention, override metadata is stored outside of the contour, but contains additional information that designates the contour, contours, or articles affected. In one embodiment of the invention these designations are explicit where specific entities are identified. In another embodiment of the invention, specific entities are not necessarily identified, but rules or filters applicable are used to select and modified the contents or constituent entities or elements of a contour. For example, override metadata (e.g., a filter) can be applied to a contour to select only a subset of the articles (or contours) in the contour. In one embodiment of the invention, override metadata can be used to change, for example, the default article owner designation, article permissions, or the root path name for all articles with a particular pathname prefix.

In one embodiment of the invention, a connection is established between the backup service and the client's system (e.g., remotely; i.e., the backup service is implemented on a separate logical device, loaded in a different virtual device, etc.; or locally, where the backup service is implemented on the same device). In this embodiment of the invention, the client generates a CI for each article that is stored on the client system. The client's system transmits the CIs to the backup service. Since these CIs identify articles uniquely, the backup service can determine whether a CICD corresponding to the CI exists on the backup service's designated storage device. If the backup service determines that it already has a CICD for an article's CI, there is no need for the client system to upload the article contents for backup on the server. If the CICD is not present on the backup service's designated storage device, the client transfers the article's contents and possibly additional data, to the backup service.

In one embodiment of the invention, the client generates CSADs for each article needed to be backed up. These CSADs can include CIs and metadata associated with the articles. These CSADs are transferred to the server, which can store the CSAD. In another embodiment of the invention, the CSADs are stored on the client and only CIs are transferred to the server.

In one embodiment of the invention, the backup service retrieves and stores exactly one CICD for each CI across all client systems. In one embodiment of the invention, the backup service only requires one copy of the CICD of an article, but can create additional copies to be used, for example, for reliability, availability, serviceability, privacy or performance purposes.

Figure 3:
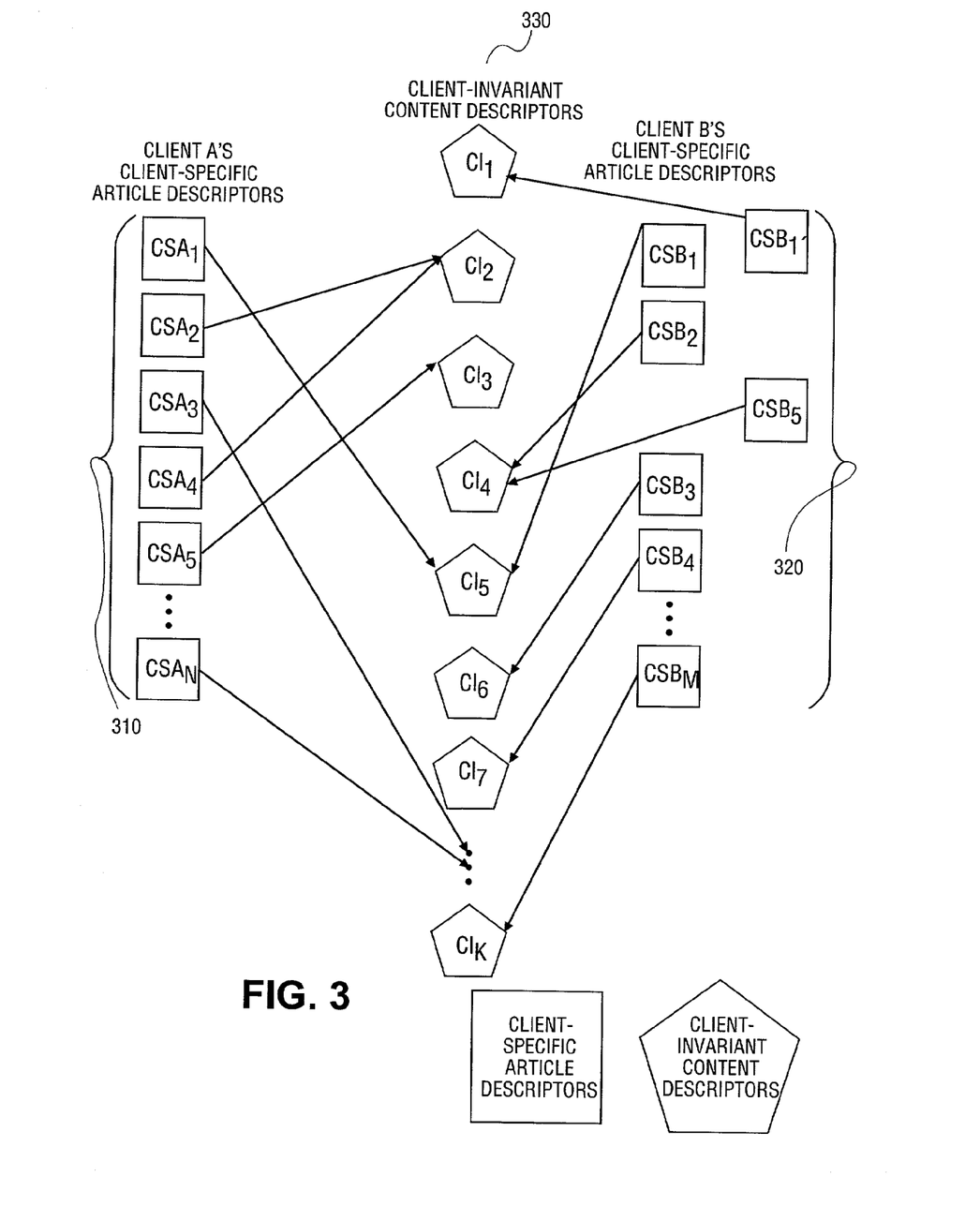
FIG. 3 illustrates an example organization of client-specific article descriptors and client-invariant content descriptors by an embodiment of the invention.

FIG. 3 illustrates an example where only one CICD per unique CI is stored at a backup service's designated storage device and can be retrieved by one or more clients. As illustrated in FIG. 3, a first client (i.e., client "A") has a group of articles stored on client A's computer system. The articles are represented by CSAD 310 ($CSA_1$–$CSA_N$). Likewise, a second client (i.e., client "B") has a group of articles stored on client B's computer system. The articles are represented by CSADs 320 ($CSB_1$–$CSB_M$). CICDs for these articles are represented by nodes 330 ($CI_1$–$CI_K$), which include article contents that are identical to the contents of respective articles on client A's and client B's respective computer systems. The articles associated with CICD nodes 330, however, can exist on client A's and client B's computer systems with varying names, attributes, etc., even though CICD 330 contains the same article contents (i.e., client-specific information can vary across clients).

Note that FIG. 3 shows a state that might be found after the backup service had been run on both client A and client B and no additions, deletions, or changes to any of the articles on either system had been made yet. That is, every CSAD has a corresponding CICD on the backup service. If changes are made to articles on the client system and a new set of CSAD's are computed, there are intervals where there may not be corresponding CICD's stored by the backup service. In that case, the backup service will transfer the articles and create the requisite CICD's to reestablish this coherent backup state.

The arrows in FIG. 3 indicate the pairing relationships between CSAD and CICD nodes. The relation is determined using the CIs; a relationship exists if a CSAD's CI is equivalent to a CICD's CI. For any given CSAD, there is exactly one corresponding CICD. Multiple CSADs, whether intra-client or inter-client, can share a single CICD. For example, client A's $CSA_2$ and $CSA_4$ both point to the $CI_2$. Thus, client A has two copies of the article contents represented by $CI_2$ and their locations (e.g., path names), permissions, attributes, etc., are described by $CSA_2$ and $CSA_4$, respectively. This is an example of intra-client article redundancy. Similarly, client A's $CSA_1$ and client B's $CSB_1$ share the same article contents, represented by node $CI_5$. This is an example of inter-client redundancy.

Figure 4:
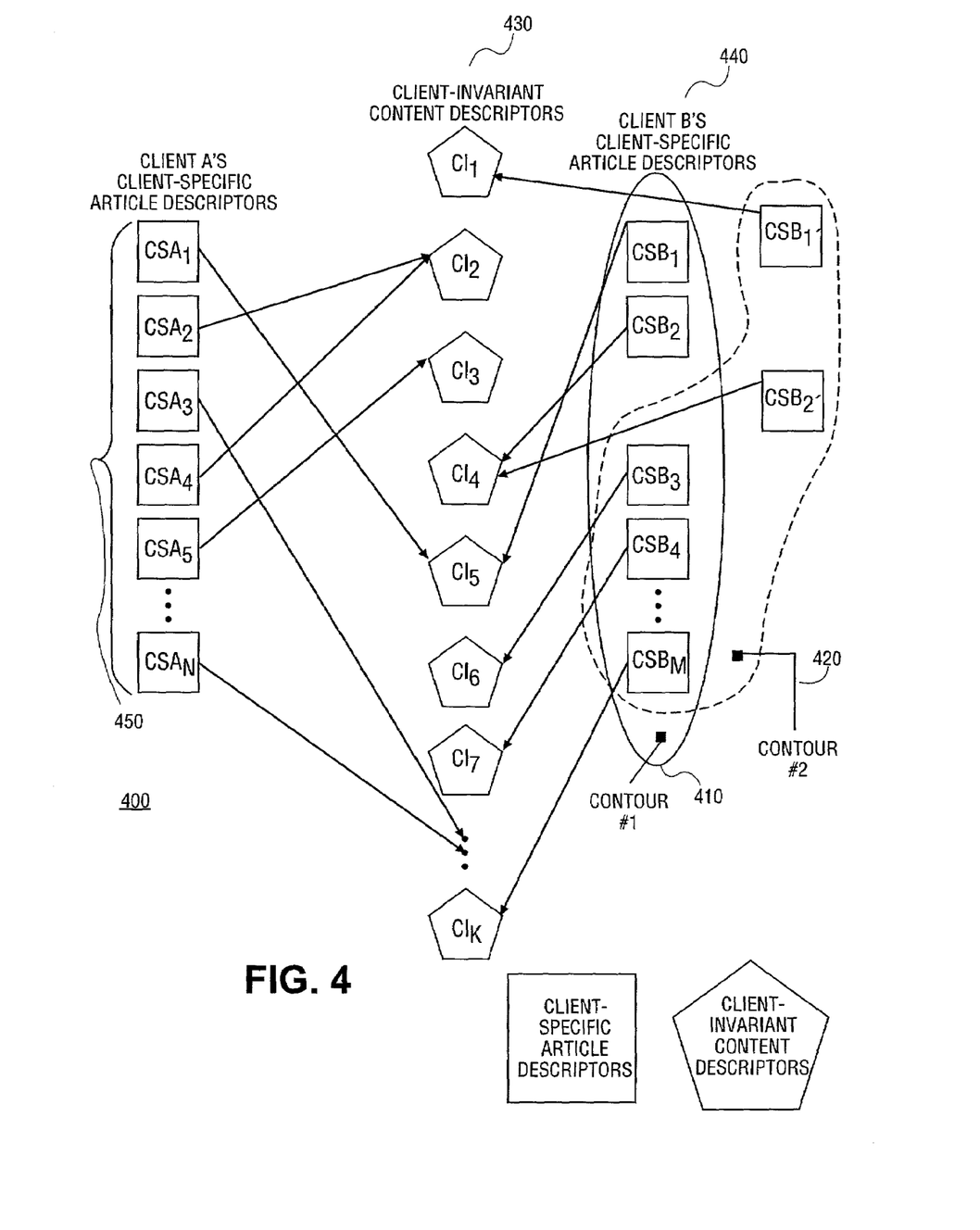
FIG. 4 illustrates an example of contour organization used by an embodiment of the invention.

FIG. 4 illustrates an example of using contours for backups. As illustrated in FIG. 4, contour #1 410 comprises client B's CSAD nodes $CSB_1$–$CSB_M$. Contour #2 420 is comprised of CSAD nodes $CSB_{1'}$, $CSB_{2'}$, and $CSB_3$–$CSB_M$. Each of client A's CSAD nodes 450 can be part of a contour for client A.

As illustrated in FIG. 4, contour #1 410 and contour #2 420 share a common subset of CSADs ($CSB_3$–$CSB_M$).

$CSB_2$ and $CSB_{2'}$ share a CICD. This situation arises, for example, if an article is moved or renamed, but not modified. The sharing of a CICD by $CSB_{2'}$ and $CSB_2$ means that the CIs are identical, implying that the article contents are identical. While contour #1 410 contains $CSB_1$, contour #2 420 does not. Therefore, the article represented by $CSB_1$ may have been removed or changed (i.e., the article contents changed). Contour #2 420 has $CSB_{1'}$. $CSB_{1'}$ can represent a new article or the modified version of some other article, for example, possibly the article represented by $CSB_1$ Like FIG. 3, FIG. 4 also illustrates the system in a state where the backup service CICD's are coherent with articles on both clients; that is, every CSAD on a client maps to some corresponding CICD on the backup service.

In one embodiment of the invention, the backup service is provided with complete contours of the client computer systems (representing a complete backup of the client systems), yet it requires very little additional bandwidth from client-to-server or storage at the backup service designated storage device. The contour generated by the client can include all of the client's computer system articles or may be a proper subset. The contour can then be used to restore the client system to a known state at a later time.

Figure 5:
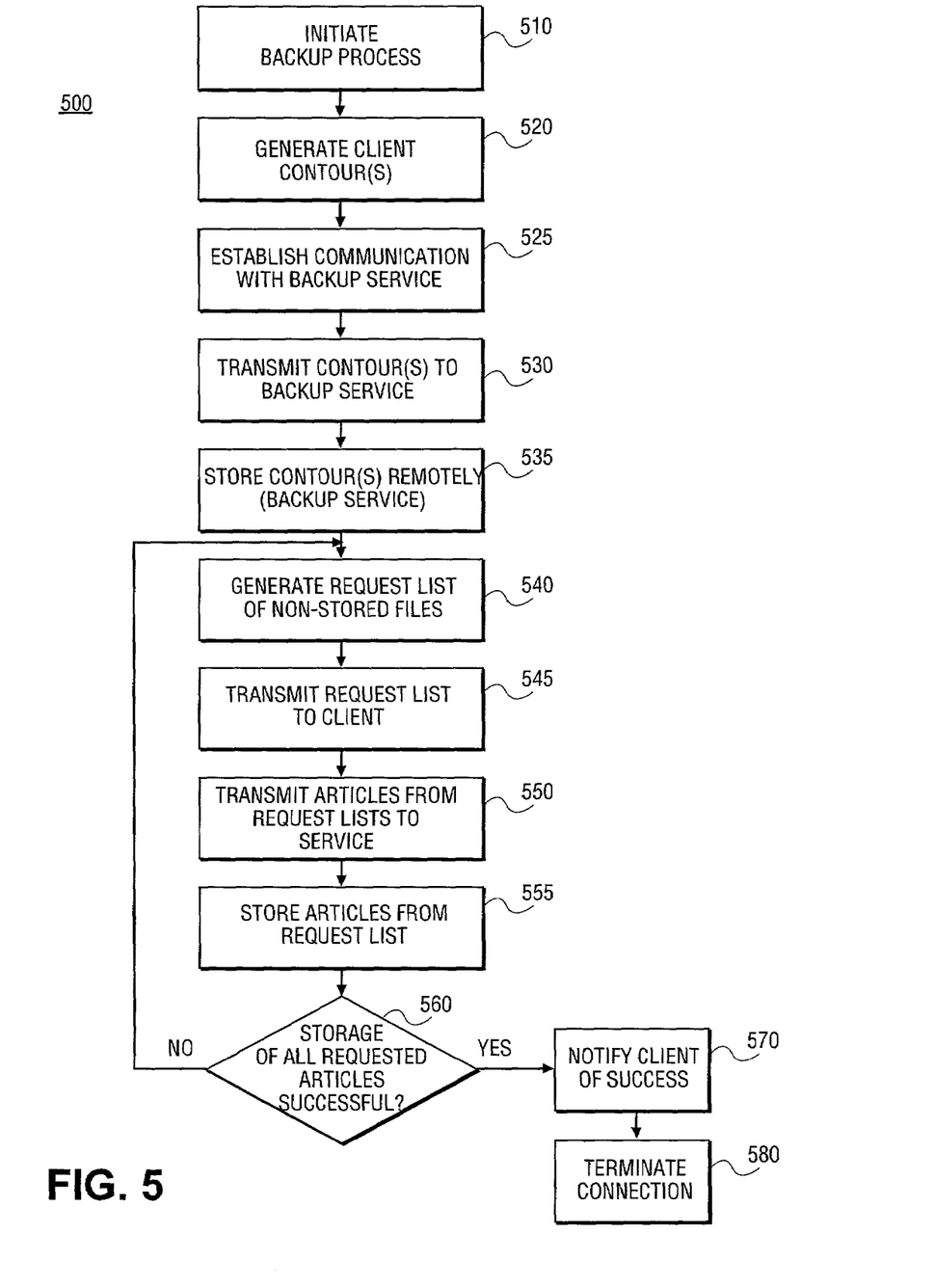
FIG. 5 illustrates a block diagram of an embodiment of the invention having a backup process.

FIG. 5 illustrates a block diagram of an embodiment of the invention having a backup process 500. Backup process 500 shows activity for interactions between a single client and server, but note that the process may be occurring simultaneously at many client systems connected to the same server or a plurality of servers. A single physical client may contain a plurality of logical clients. The backup process 500 is initiated in block 510. For example, a user on the client's computer system, an automatic or semi-automatic process on the client system, an automated process on a remote backup server, etc. may initiate the process. Process 500 continues with block 520, where one or more client contours are generated. The client contour(s) generated in block 520 are comprised of the CI for each article and possibly associated metadata (i.e., a CSAD). In one embodiment of the invention, the client contours are given names, time stamped, and annotated.

Process 500 continues with block 525 where communication is established between the client computer system and the backup service. One should note that the communication connection is typically a secure, encrypted connection. Process 500 continues with block 530, where the client contours are transmitted from the client's computer system to the backup service. Process 500 continues with block 535, which stores the client contours on the designated backup service storage device. Therefore, the backup service saves the specific contours for the particular client's computer system.

Process 500 continues with block 540, which generates an article request list as follows. The backup service, using the client contours, produces a subset list of articles (identified by CIs) for which article contents are not already stored at the backup service's designated storage device. The backup service can, for example, use a database or catalog of articles that are indexed or accessed using their CI to determine if the article contents are already stored. Articles in the client contours that are not stored at the designated storage device (as determined by indexing the database/catalog with the associated CIs) are added to the article request list. Process 500 continues with block 545, where the backup service transmits the article request list (including CIs only, as there is no need to send any metadata back) to the client's system).

It should be noted that additional embodiments of the invention can transmit alternate article identifiers between the client and server. In one embodiment of the invention, the articles in a contour are numbered. The client and server may use this numerical identification when identifying articles in the contours (e.g., in the article request list or in the subsequent transfer of the full article contents). A numerical identification may require less storage space and transmission bandwidth than a CI value because the alternate article identifiers may be smaller than the associated CIs.

The embodiment of the invention discussed above transferred the full contents of the article being stored at the server. Alternative embodiments of the invention may not transfer the full contents of the article to be backed up, transfer only metadata or transfer only part of available metadata. In another embodiment of the invention, less than the full contents of the article may be transmitted. In referring to the actions taken in all of these embodiments of the invention, this specification refers to transferring a "portion" of contents of an article or metadata, but it should be understood that "a portion" may also mean the full contents or metadata.

Process 500 continues with block 550, where the client's computer system transmits the articles in the article request list to the backup service for storage at the designated storage device. Here, each article is paired with its associated CI (or alternative identifier form) and transferred to the backup service. Process 500 continues with block 555, where the backup service stores the requested articles and associated CIs in a database on the backup service's designated storage device. Note that the articles are stored in a form accessible using the CI (or alternate identification mechanism). Block 560 then determines whether all of the articles in the article request list were stored successfully.

If block 560 determines that all the articles in the article request list were stored successfully by the backup service, then process 500 continues with block 570. Block 570 notifies (e.g., transmits a message, etc.) the client's system of the successful storage of the articles. Block 580 then terminates the connection between the client and the backup service. If block 560 determines that the storage of all the articles in the article request list have not yet completed successfully, then process 500 continues back with block 540 and attempts to store only the articles that have not yet been successfully stored. In one embodiment of the invention, the successful storage of articles is verified by mechanisms such as signatures (e.g., checksums), error detection mechanisms, etc. This is further discussed below.

Figure 6:
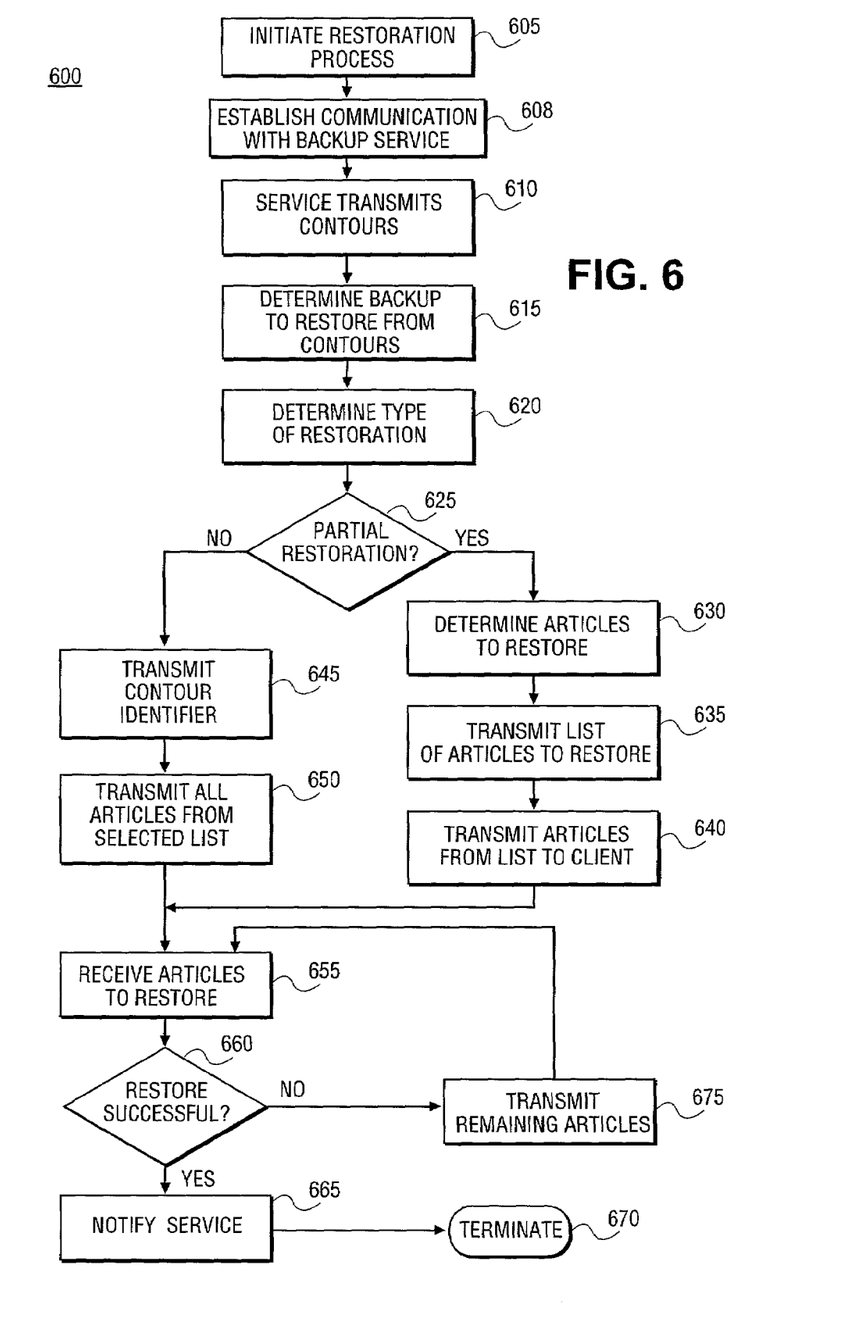
FIG. 6 illustrates a block diagram of an embodiment of the invention having a restoration process.

FIG. 6 illustrates a block diagram of an embodiment of the invention having restoration process 600. Process 600 begins with block 605, where the restoration process is initiated. As with process 500, process 600 describes interactions between a single client and server, but note that the process may be occurring simultaneously at many client systems connected to the same server or a plurality of servers. As with Process 500, this initiation can be through a variety of manual, semi-automatic and automatic mechanisms. The restoration of articles onto a client's computer system can be used to replace deleted articles, destroyed articles, etc. Process 600 continues with block 608 wherein communication is established between the client computer system and the backup service. Note that this connection can be secure and encrypted for security and privacy purposes.

Process 600 continues with block 610 wherein the backup service transmits client contours that were previously stored by the backup service. This may include all contours stored at the backup service or a subset, and usually is, but not necessarily, restricted to those contours for that specific client. It should be noted that other embodiments of the invention can replace the functionality in block 610. In one embodiment of the invention, client contours, or copies thereof, may be stored on the client system (e.g. during the backup process), obviating the need to transfer contours from the server. Process 600 continues with block 615. In block 615, the client determines which articles to restore from the group of contours received from the backup service. That is, the client chooses all articles described in a particular contour or some subset of articles in the contours for restoration. Additionally, in some embodiments of the invention, the client can choose restoration parameters. Restoration parameters can comprise, for example, restoration restrictions to a subset of articles in the contour (e.g., all joint pictures expert group (JPEG) photo files or all dynamic link library (dll) files, etc.), alternate restoration locations, etc. In block 620, the client determines if a partial or full restoration is desired.

Process 600 continues with block 625, which determines whether the client desires partial or full restoration of articles. If the client decides to select a partial restoration, process 600 continues with block 630. In block 630, the client determines which articles are to be restored on the client's computer system. Once the client determines the articles to be restored to the client's computer system, process 600 continues with block 635. In block 635, the client's computer system transmits the list of selected articles to be restored to the backup service. This list consists of CIs (or other identifiers, as discussed above) for the selected articles.

Process 600 continues with block 640, wherein the backup service transmits the selected articles to the client's computer system. Process 600 continues with block 655, wherein the client's computer system receives the articles. One should note, that if the contour includes full metadata information, the articles restored will have the client-specific information as they had at the time they were stored at the backup service (e.g., article path name, permissions, time stamps, attributes, etc.) although restoration parameters can alter one or all of them by, for example, restoring them in a different location. Note that the storage of metadata in the contour and its use during restoration by the client system is optional. In some cases, the client system will not use this metadata if it is available.

Since process 600 may be active on many client systems, the backup service may transmit articles to many systems simultaneously or over time. Since different clients may share article representations on the backup service (i.e. they have articles with identical content identifiers), the backup service may transmit all or a given portion of an article or metadata to multiple clients.

Process 600 continues with block 660 wherein the client's computer system determines whether the selected articles to be restored were successfully stored (i.e., restored) on the client's computer system. Successful restoration can be verified by means such as signatures (e.g., checksums), error detection mechanisms, etc. If the client's computer system determines that the restoration process has been successful, then the backup service is notified and the restoration process is then terminated with block 670. If all articles have not been successfully stored, the process continues with block 675 where the remaining unsuccessfully transmitted articles are transmitted. After block 675, block 655 is again entered. In one embodiment of the invention, a temporary storage area is used for restoration of articles that need to be restored during shutdown so as not to cause the system to fail (i.e., "crash"). In this embodiment of the invention, the articles are restored when it is safe to do so (e.g., at shutdown, before boot-up, etc.).

In one embodiment of the invention, if the client's computer system has a catastrophic event (such as a hard drive failure, main memory failure, etc.), a special loading device (such as a floppy-disk, memory storage module, flash memory card, etc.) containing basic OS articles and restoration process 600 can be used to restore articles to an available storage device.

If block 625 determines that a full restoration of articles is requested, process 600 continues with block 645. In block 645, the client transmits an identifier for the contour selected for restoration to the backup service. In block 650, all the articles included in the selected contour are transmitted from the backup service to the client computer system. Process 600 continues with block 655. Again, if the requested articles are not restored, the process resumes to only request those articles that have not been successfully transferred.

In an embodiment of the invention, the number of retries may be limited or back-off and retry mechanisms may be used to circumvent transient problems, such as, for example, a temporarily noisy communication channel. In an embodiment of the invention, the backup and restore processes would ensure that there are sufficient resources on the client before and during the process execution. Such resources might include, for example, battery power reserves or available storage space.

One should note that there are many scenarios that can be selected by a client regarding process 500 and process 600, e.g., when to backup, how to connect to the backup service, how to verify the successful backup or restoration of an article, etc.

By using CIs to reference articles, the backup process on a client's computer system can take less time to complete by not having to upload client-invariant information, which includes an article's contents and attributes. One should note that some attributes can be uploaded as an option, such as file size, etc. Only an article's client-specific information (which includes the CI) is necessary to upload as long as an article with the exact same contents is already stored on a backup service's designated storage device. Therefore, with a large pool of client computer systems, a backup service would only need to store a single copy of client-invariant information, as well as client-specific information for the various clients, which backup a given article. Thus, if all clients in a client pool have an article "XYZ," only one copy of the contents of article "XYZ" would need to be stored by the backup service, along with the client-specific information for each client in the pool. This results in minimizing storage space on the backup service's designated storage device. Additionally, this results in a client spending less backup time (due to transferring only client-specific information for articles having the same contents). This is beneficial for the clients since less data needs to be transferred to the backup service's designated storage device. In one embodiment of the invention, where only metadata is changed for a particular article, only the changed metadata is transmitted to the backup service from the client's computer system. Therefore, it is not necessary to transfer the article's contents to the backup service. Thus, time and bandwidth are reduced since it is possible to complete entire client computer system backups with very little information exchanged.

In one embodiment of the invention, in order to insure backup process integrity, signatures (e.g., checksums) or other error detection information can be computed and exchanged. This information may include: contour differences exchanged, contour similarities not exchanged, the full reference contour, full new (current backup) contours; the backup service reconstructs the contour from the differences received, etc. The client computer system and the backup service can then exchange this error detection information as a cross-check. This is to ensure that the backup service and the client's computer system are in agreement and that no corruption has occurred (e.g., malicious attempts to modify or thwart the backup process, communication errors, etc.). One should note that the differential backup process is resilient to metadata attacks that might try to inhibit proper backup procedures. For example, a malicious process could toggle archive bits or timestamps to prevent the backup system from saving certain articles or detecting changes to those articles. A failing storage device could exhibit similar behavior. Because Content Identifiers are derived from the article contents, it is significantly more difficult to hide article changes.

In one embodiment of the invention, signature (e.g., cryptographic hash or checksum) fields may be transferred between client and server during backup or restore. The signature fields can be implemented in specific fields, across all fields, or in a subset of fields being transferred between the client and server. In one embodiment of the invention, signature fields are included within the Client-Invariant Content Descriptors (illustrated in FIG. 2). Another embodiment of the invention includes signature fields within Client-Specific Article Descriptors (illustrated in FIG. 1).

In one embodiment of the invention, contours are permitted to be stored on both the client computer system and the backup service's designated storage device in expanded or differential forms. In one embodiment of the invention, the copies stored on the client's computer system are used for improving backup service efficiency. If a contour copy is lost or damaged, master contours that are specific to the client can be retrieved from the backup service. Signature checksums can be used to verify integrity, for example. In addition, portions of contours may be transferred between client and server. For example, a subset of the full contour contents may be transferred from server to client if the client wishes to restore only a portion of the contour (e.g. the client had backed up multiple hard drives to the server, but now wishes to restore only files from a single drive). This transfer of portions of contours further optimizes the communication mechanism. When reference is made to a portion of a contour, this may refer to the whole contour or to a proper subset of the contour.

In one embodiment of the invention, when an article is added to the client's computer system, the full set of client-specific information is transmitted to the backup service for the added article. If an article's content already resides on the backup service's designated storage device (in client-invariant storage, which includes the article's contents), the client-invariant information is not transmitted. Otherwise, the client-invariant information, which includes the article contents, is transmitted. Regardless, the client-specific information is added to the contour.

In one embodiment of the invention, an optimization can be made in the case where an article is deleted and expanded contours are stored, but differential contours are used to minimize bandwidth between the client system and backup service. When the differential contour is transferred, the reference contour is expanded, if necessary (by de-referencing any chained differential contour representations), essentially copied and the entry corresponding (based on the unique content identification) to the deleted article is removed. If all reference contours are expanded contours then this operation is very fast.

In one embodiment of the invention, when an article's client-specific information is modified, only an article identifier is transmitted (e.g., CI or an equivalent) along with the associated fields that have changed and their associated information.

In one embodiment of the invention, differential contours are transmitted to the backup service, which then expands the backup articles through chaining. In this embodiment of the invention, the differential contour, expanded contour, or subset can be stored by the backup service. In one embodiment of the invention, the client's computer system can transmit expanded contours and the backup service can compute differential contours from the expanded contour. One should note that expansion and differential processes can occur on either the client's computer system, by the backup service, or in any combination.

Figure 7:
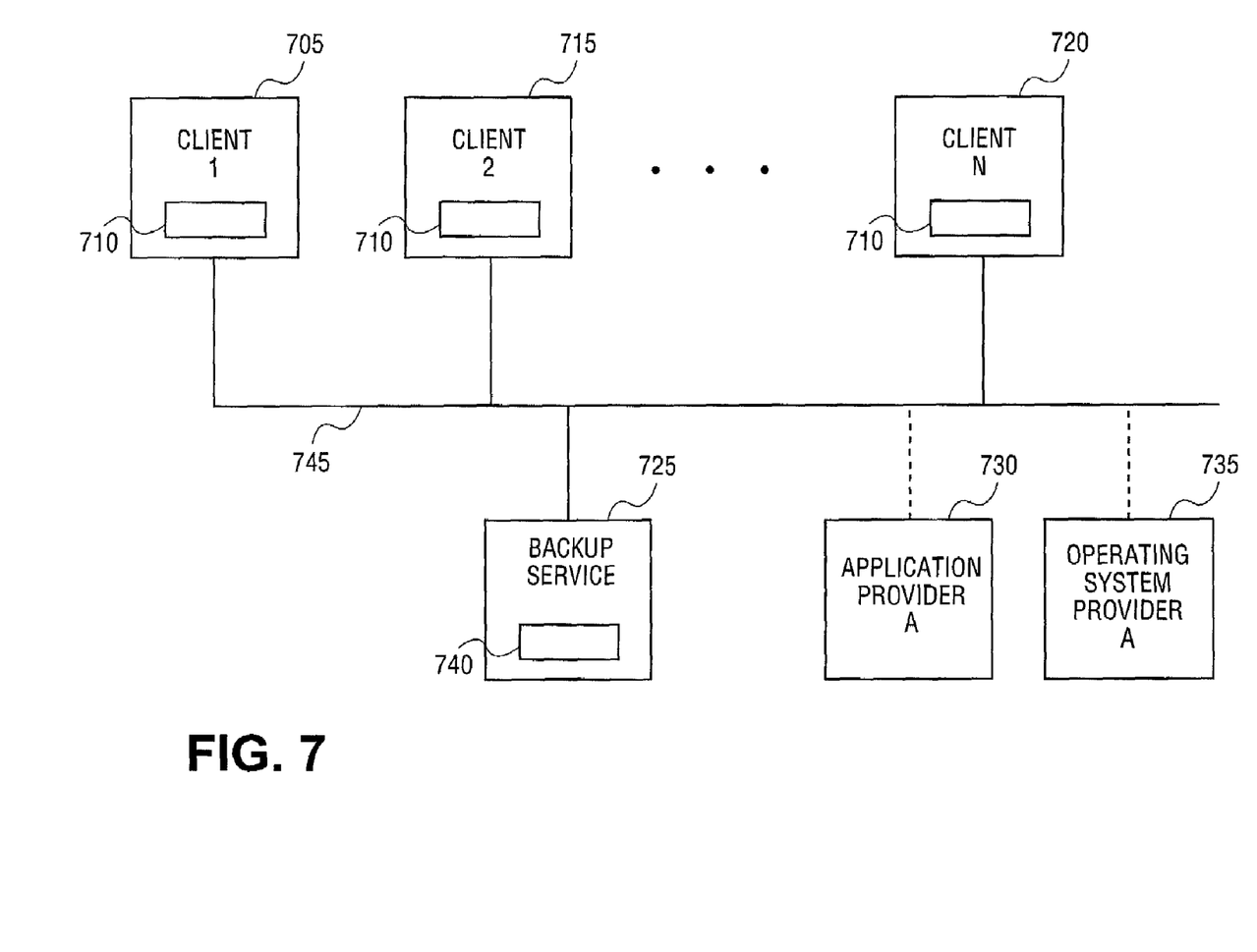
FIG. 7 illustrates an embodiment of the invention wherein multiple clients can connect with a backup service system.

FIG. 7 illustrates an embodiment of the invention wherein multiple clients/hosts can be coupled with a backup process. As illustrated in FIG. 7, client/host A 705, client/host 715 through client/host N 720 can connect to a backup service 725 performing on another client/host via a transmission medium 745. One should note that transmission medium 745 can be any transmission medium, including the Internet, intranets, local-area networks, wireless communication networks, intra-system (e.g. dedicated wire link or bus), etc. Each client can perform a backup service for itself or any other client(s) if connected with each other. Backup service 725 can be embedded in software that is installed on each individual client/host, a temporary process running on the client's/host's computer system, a chipset, microprocessor, or special instruction set architecture extensions for computing unique file identifiers and running backup/restoration processes on the individual client's/host's computer system, etc. Thus, in some instances, the client's computer system need not have backup service 725 installed in any fashion on the client's computer system. One should note that various processes performed by the backup service 725 may be split across multiple devices, sources, clients/hosts, etc.

Also coupled with one or more hosts/clients is a storage device 710. Storage device 710 can be any device capable of storing information either permanently or temporarily. Articles to be backed up/restored may reside on any storage device coupled to any client/host. Each client/host can be coupled with each other's storage device, any combination of storage devices, or only its own storage device. One should note that storage devices 710 coupled to each client need not be the same type of device (e.g., storage device 710 coupled to client A 705 may be a cache memory, storage device 710 coupled to client B 715 may be a tape drive, and storage device 710 coupled to client N 720 may be a re-writeable compact disc (CDRW) drive).

Backup service 725 is coupled with storage device 740. Storage device 740 can be coupled similarly to storage device 710 (with reference to client computer systems). In one embodiment of the invention various application providers, such as application provider A 730, and various operating system providers, such as operating system provider A 735, can also be coupled with backup service 725. By having application providers and operating system providers coupled with backup service 725, reference contours can be transmitted either to backup service 725 or directly to clients coupled to backup service 725.

In an alternative embodiment of the invention, the backup service and client may both be resident on a single device (implementing the backup and restore processes). In this embodiment of the invention, the service's designated storage device may be directly tethered to the client system or it may be remote. For example, the backup service may access a tape drive attached directly to the device.

The above embodiments of the invention can also be stored on a device or machine-readable medium and be read by a machine to perform instructions. The machine-readable medium includes any mechanism that provides (i.e., stores and/or transmits) information in a form readable by a machine (e.g., a computer). For example, a machine-readable medium includes read-only memory (ROM); random-access memory (RAM); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers.

While certain exemplary embodiments of the invention have been described and shown in the accompanying drawings, it is to be understood that such embodiments of the invention are merely illustrative of and not restrictive on the broad invention, and that this invention not be limited to the specific constructions and arrangements shown and described, since various other modifications may occur to those ordinarily skilled in the art.

What is claimed is:

1. A method comprising:
   generating a content identifier for at least one article, the content identifier representing the at least one article, the content identifier is a hash of contents of the at least one article and at least one portion of metadata,
   generating a client-invariant content descriptor including the content identifier, contents of the at least one article, commonly shared metadata between at least two clients and a content signaturing mechanism identifier,
   determining if at least one portion of the at least one article is present on at least one device based on the content identifier,
   generating at least one portion of at least one differential contour for a plurality of articles
   storing the at least one portion of the at least one article if the at least one portion of the at least one article is determined to be not present on the at least one device, and
   transmitting only an article identifier if the at least one article only has client-specific information modified from prior information.

2. The method of claim 1, wherein the content identifier is generated from one of
   a hash of contents of the at least one article,
   a combination of a hash of contents of the at least one article and at least one portion of metadata,
   at least one content signaturing algorithm over contents of the at least one article,
   at least one content signaturing algorithm over contents of the at least one article and at least one portion of metadata, and
   a combination of at least one content signaturing algorithm over contents of the at least one article and at least one portion of metadata.

3. The method of claim 1, wherein the at least one portion of the at least one article includes one of a portion of contents of the at least one article, at least one portion of metadata, and a portion of contents of the at least one article and at least one portion of metadata.

4. The method of claim 3, wherein at least one portion of the at least one article is stored on the at least one device and at least two articles have the same at least one portion.

5. The method of claim 4, wherein the at least two articles reside on one of at least two separate devices and one device.

6. The method of claim 3, wherein a plurality of copies of the at least one portion of the at least one article are stored on the at least one device.

7. The method of claim 1, determining if the at least one portion of the at least one article is present on the at least one device based on the content identifier further comprising:
   determining if a portion of a second article is present on the at least one device, the portion of the second article represented by a content identifier identical to the content identifier for the at least one article where the content identifier for the portion of the second article is determined using the same mechanism as the content identifier for the at least one article.

8. The method of claim 7, wherein the portion of the second article includes one of a portion of contents of the second article, at least one portion of metadata, and a portion of contents of the second article and at least one portion of metadata.

9. The method of claim 1, further comprising:
   generating at least one portion of at least one contour for a plurality of articles.

10. The method of claim 9, wherein the at least one contour includes one of content identification for each of the plurality of articles, and content identification for each of the plurality of articles and metadata, wherein content identification for each of the plurality of articles is generated from one of
    a hash of contents of the particular article,
    a hash of contents of the particular article and at least one portion of metadata,
    a combination of a hash of contents of the particular article and at least one portion of metadata,
    at least one content signaturing algorithm over contents of the particular article,
    at least one content signaturing algorithm over contents of the particular article and at least one portion of metadata, and
    a combination of at least one content signaturing algorithm over contents of the particular article and at least one portion of metadata.

11. The method of claim 9, further including:
    storing the at least one portion of the at least one contour.

12. The method of claim 11, wherein the at least one portion of the at least one contour is stored on one of the at least one device and a source device, wherein the source device is one of local and remote to the at least one device.

13. The method of claim 1, wherein the at least one article is originally stored on one of the at least one device and a source device, wherein the source device is one of local and remote to the at least one device.

14. A method comprising:
    requesting at least one portion of at least one article by a content identifier representing the at least one article, the content identifier is a hash of contents of the at least one article and at least one portion of metadata,
    determining if a client-invariant content descriptor is present on at least one device, the client-invariant content descriptor including the content identifier, contents of the at least one article, commonly shared metadata between at least two clients and a content signaturing mechanism identifier, determining if the at least one portion of at least one article is present on at least one device based on the content identifier, returning the at least one portion of the at least one article if the at least one portion of the at least one article is determined to be present on the at least one device, determining if at least one portion of at least one differential contour for a plurality of articles exists on the at least one device, and transmitting only an article identifier if the at least one article only has client-specific information modified from prior information.

15. The method of claim 14, wherein the content identifier is generated from one of
a hash of contents of the at least one article,
a combination of a hash of contents of the at least one article and at least one portion of metadata,
at least one content signaturing algorithm over contents of the at least one article,
at least one content signaturing algorithm over contents of the at least one article and at least one portion of metadata, and
a combination of at least one content signaturing algorithm over contents of the at least one article and at least one portion of metadata.

16. The method of claim 14, wherein the at least one portion of the at least one article includes one of a portion of contents of the at least one article, at least one portion of metadata, and a portion of contents of the at least one article and at least one portion of metadata.

17. The method of claim 14, wherein a plurality of representations of the at least one portion of the at least one article are returned.

18. The method of claim 14, wherein requesting at least one article by a content identifier representing the article further comprises:
selecting at least one portion of at least one article represented in at least one portion of at least one contour, wherein the at least one portion of the at least one contour includes one of content identification for each of the plurality of articles, and content identification for each of the plurality of articles and at least one portion of metadata, and
requesting the at least one portion of at least one article represented in at least one portion of at least one contour using the content identifier for the at least one article.

19. The method of claim 18, further including:
returning the at least one portion of at least one article represented by the at least one portion of at least one contour.

20. The method of claim 19, wherein the at least one portion of the at least one article includes one of a portion of contents of the at least one article, at least one portion of metadata, and a portion of contents of the at least one article and at least one portion of metadata.

21. The method of claim 18, wherein the at least one portion of at least one contour is originally stored on one of the at least one device and a source device, wherein the source device is one of local and remote to the at least one device.

22. The method of claim 14, wherein the at least one portion of at least one article is originally stored on one of the at least one device and a source device, wherein the source device is one of local and remote to the at least one device.

23. An apparatus comprising a machine-readable medium containing instructions which, when executed by a machine, cause the machine to perform operations comprising:
generating a content identifier for at least one article, the content identifier representing the article, the content identifier is a hash of contents of the at least one article and at least one portion of metadata,
determining if a client-invariant content descriptor is present on at least one device, the client-invariant content descriptor including the content identifier, contents of the at least one article, commonly shared metadata between at least two clients and a content signaturing mechanism identifier,
determining if at least one portion of the at least one article is present on at least one device based on the content identifier, and
generating at least one portion of at least one differential contour for a plurality of articles,
storing the at least one portion of the at least one article if the at least one article is determined to be not present on the at least one device, and
transmitting only an article identifier if the at least one article only has client-specific information modified from prior information.

24. The apparatus of claim 23, wherein the content identifier is generated from one of
a hash of contents of the at least one article,
a combination of a hash of contents of the at least one article and at least one portion of metadata,
at least one content signaturing algorithm over contents of the at least one article,
at least one content signaturing algorithm over contents of the at least one article and at least one portion of metadata, and
a combination of at least one content signaturing algorithm over contents of the at least one article and at least one portion of metadata.

25. The apparatus of claim 23, wherein the at least one portion of the at least one article includes one of a portion of contents of the at least one article, at least one portion of metadata, and a portion of contents of the at least one article and at least one portion of metadata.

26. The apparatus of claim 25, wherein at least one portion of the at least one article is stored on the at least one device and at least two articles have the same at least one portion.

27. The apparatus of claim 26, wherein the at least two articles reside on one of at least two separate devices and one device.

28. The apparatus of claim 25, wherein a plurality of copies of the at least one portion of the at least one article are stored on the at least one device.

29. The apparatus of claim 23, determining if the at least one portion of the at least one article is present on the at least one device based on the content identifier further comprising:
determining if a portion of a second article is present on the at least one device, the portion of the second article represented by a content identifier identical to the content identifier for the at least one article where the content identifier for the second article is determined using the same mechanism as the content identifier for the at least one article.

30. The apparatus of claim 29, wherein the at least one portion of the second article includes one of a portion of contents of the second article, at least one portion of metadata, and a portion of contents of the second article and at least one portion of metadata.

31. The apparatus of claim 23, further containing instructions which, when executed by a machine, cause the machine to perform operations including:
generating at least one portion of at least one contour for a plurality of articles.

32. The apparatus of claim 31, wherein the at least one contour includes one of content identification for each of the plurality of articles, and content identification for each of the plurality of articles and at least one portion of metadata, wherein content identification is generated from one of
a hash of contents of the at least one article,
a hash of contents of the at least one article and at least one portion of metadata,
a combination of a hash of contents of the at least one article and at least one portion of metadata,
at least one content signaturing algorithm over contents of the at least one article,
at least one content signaturing algorithm over contents of the at least one article and at least one portion of metadata, and
a combination of at least one content signaturing algorithm over contents of the at least one article and at least one portion of metadata.

33. The apparatus of claim 31, further containing instructions which, when executed by a machine, cause the machine to perform operations including:
storing the at least one portion of the at least one contour.

34. The apparatus of claim 33, wherein the at least one portion of the at least one contour is stored on one of the at least one device and a source device, wherein the source device is one of local and remote to the at least one device.

35. The apparatus of claim 23, wherein the at least one article is originally stored on one of the at least one device and a source device, wherein the source device is one of local and remote to the at least one device.

36. An apparatus comprising a machine-readable medium containing instructions which, when executed by a machine, cause the machine to perform operations comprising:
requesting at least one portion of at least one article by a content identifier representing the at least one article, the content identifier is a hash of contents of the at least one article and at least one portion of metadata,
determining if a client-invariant content descriptor is present on at least one device, the client-invariant content descriptor including the content identifier, contents of the at least one article, commonly shared metadata between at least two clients and a content signaturing mechanism identifier,
determining if the at least one portion of at least one article is present on at least one device based on the content identifier, and
returning at least one portion of the at least one article if the at least one portion of the at least one article is determined to be present on the at least one device,
determining if at least one portion of at least one differential contour for a plurality of articles exists on the at least one device, and
transmitting only an article identifier if the at least one article only has client-specific information modified from prior information.

37. The apparatus of claim 36, wherein the content identifier is generated from one of
a hash of contents of the at least one article,
a combination of a hash of contents of the at least one article and at least one portion of metadata,
at least one content signaturing algorithm over contents of the at least one article,
at least one content signaturing algorithm over contents of the at least one article and at least one portion of metadata, and
a combination of at least one content signaturing algorithm over contents of the at least one article and at least one portion of metadata.

38. The apparatus of claim 36, wherein the at least one portion of the at least one article includes one of a portion of contents of the at least one article, at least one portion of metadata, and a portion of contents of the at least one article and at least one portion of metadata.

39. The apparatus of claim 38, wherein a plurality of representations of the at least one portion of the at least one article are returned.

40. The apparatus of claim 36, further containing instructions which, when executed by a machine, cause the machine to perform operations including:
selecting at least one portion of at least one article represented in at least one portion of at least one contour, wherein the at least one portion of the at least one contour includes one of content identification for each of the plurality of articles, and content identification for each of the plurality of articles and at least one portion of metadata, and
requesting the at least one portion of at least one article represented in at least one portion of at least one contour using the content identifier for the at least one article.

41. The apparatus of claim 40, further containing instructions which, when executed by a machine, cause the machine to perform operations including:
returning at least one portion of at least one article represented by the at least one portion of at least one contour.

42. The apparatus of claim 41, wherein the at least one portion of the at least one article includes one of a portion of contents of the at least one article, at least one portion of metadata, and a portion of contents of the at least one article and at least one portion of metadata.

43. The apparatus of claim 41, wherein the at least one portion of at least one contour is originally stored on one of the at least one device and a source device, wherein the source device is one of local and remote to the at least one device.

44. The apparatus of claim 36, wherein the at least one portion of at least one article is originally stored on one of the at least one device and a source device, wherein the source device is one of local and remote to the at least one device.

45. A system comprising:
a plurality of devices coupled to a transmission medium, each of the plurality of devices coupled with a first process and a second process and having at least one article,
wherein the first process:
generates a content identifier for the at least one article for each of the plurality of devices, the content identifier representing the at least one article, the content identifier is a hash of contents of the at least one article and at least one portion of metadata,
generates a client-invariant content descriptor, the client-invariant content descriptor including the content identifier, contents of the at least one article, commonly shared metadata between at least two clients and a content signaturing mechanism identifier, determines if the at least one article is present on at least one other of the plurality of devices based on the content identifier, and generates at least one portion of at least one differential contour for a plurality of articles and stores at least one portion of the at least one article if the at least one portion of the at least one article is determined to be not present on the at least one other of the plurality of devices, transmits only an article identifier if the at least one article only has client-specific information modified from prior information wherein the second process:

requests at least one portion of a second article by the content identifier representing the second article,     determines if the at least one portion of the second article is present on at least one of the plurality of devices based on the content identifier,     returns the at least one portion of the second article if the at least one portion of the second article is determined to be present on the at least one of the plurality of devices,     determines if at least one portion of at least one differential contour for a plurality of articles exists on at least one of the plurality of devices, and     transmits only an article identifier if the at least one article only has client-specific information modified from prior information.

46. The system of claim 45, wherein the content identifier is generated from one of a hash of contents of the at least one article, a combination of a hash of contents of the at least one article and at least one portion of metadata, at least one content signaturing algorithm over contents of the at least one article, at least one content signaturing algorithm over contents of the at least one article and at least one portion of metadata, and a combination of at least one content signaturing algorithm over contents of the at least one article and at least one portion of metadata.

47. The system of claim 45, wherein the at least one portion of each of the at least one article and the second article include one of a portion of contents of the at least one article, at least one portion of metadata, and a portion of contents of the at least one article and at least one portion of metadata.

48. The system of claim 45, wherein the first process further:

generates at least one portion of at least one contour for a plurality of articles for at least one of the plurality of devices and stores at least one portion of the at least one contour on at least one of the plurality of devices.

49. The system of claim 45, wherein the second process further:

selects at least one portion of at least one article represented in at least one portion of at least one contour, wherein the at least one portion of the at least one contour includes one of content identification for each of the plurality of articles, and content identification for each of the plurality of articles and at least one portion of metadata, and requests the at least one portion of at least one article represented in at least one portion of at least one contour using the content identifier for the at least one article.

* * * * *